Feb. 23, 1971   J. GIRAULT ET AL   3,566,393
CONVERTERS DELIVERING IN ANALOGUE FROM TWO VOLTAGES RESPECTIVELY
PROPORTIONAL TO THE SINE AND COSINE OF AN INPUT ANGLE
GIVEN IN DIGITAL FORM
Filed June 15, 1967   2 Sheets-Sheet 1

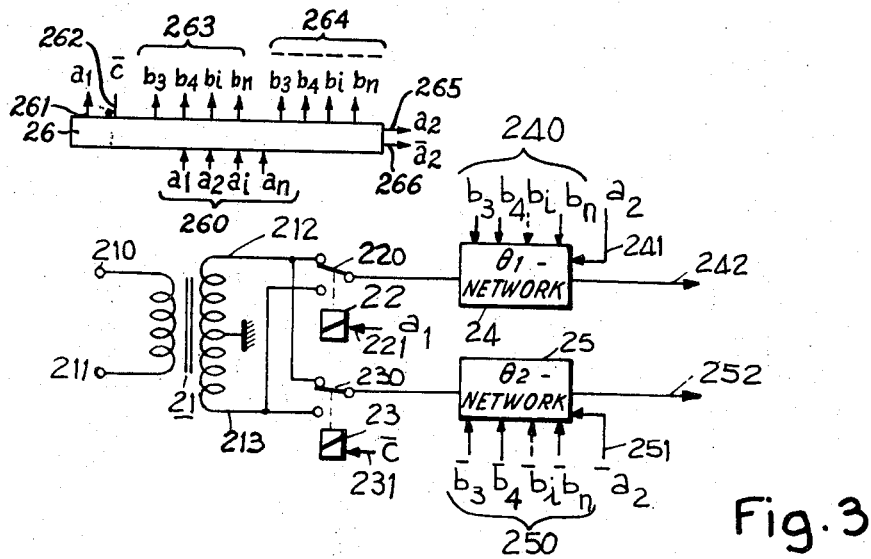
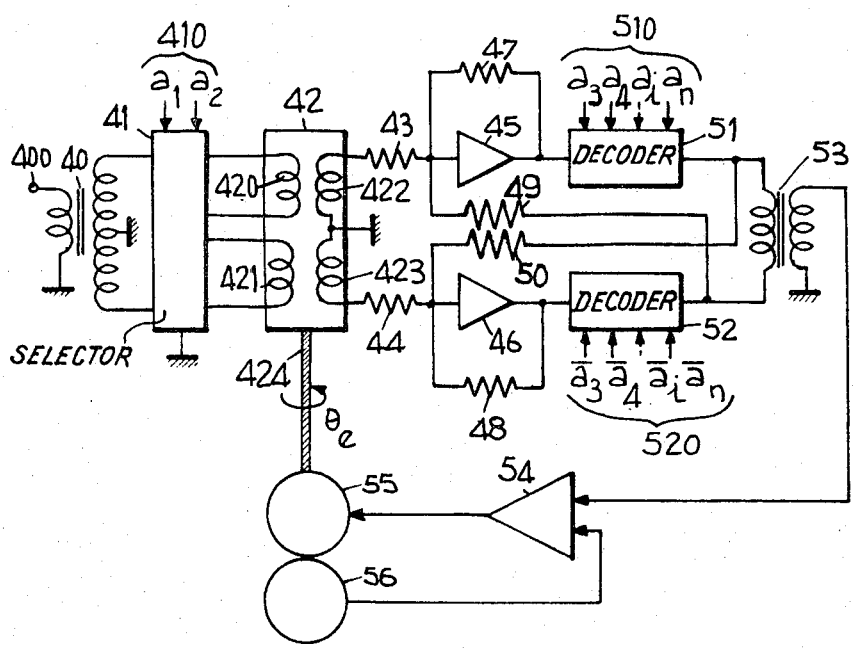
Fig. 3
Fig. 4

United States Patent Office 3,566,393
Patented Feb. 23, 1971

3,566,393
CONVERTERS DELIVERING IN ANALOGUE FORM TWO VOLTAGES RESPECTIVELY PROPORTIONAL TO THE SINE AND COSINE OF AN INPUT ANGLE GIVEN IN DIGITAL FORM
Jean Girault and André Bonnal, Paris, France, assignors to CSF-Compagnie Generale de Telegraphie Sans Fil, a corporation of France
Filed June 15, 1967, Ser. No. 646,308
Claims priority, application France, July 5, 1966, 68,159
Int. Cl. H03k 13/04
U.S. Cl. 340—347       4 Claims

ABSTRACT OF THE DISCLOSURE

A digital-to-analogue converter circuit of the type supplying, from an angle $\theta_1$ comprised between 0 and 90° and given in digital form, two output voltages $Us_1$ and $Us_2$ such that $$\frac{Us_1}{Us_2} = \tan \theta_1$$

Figure 1:
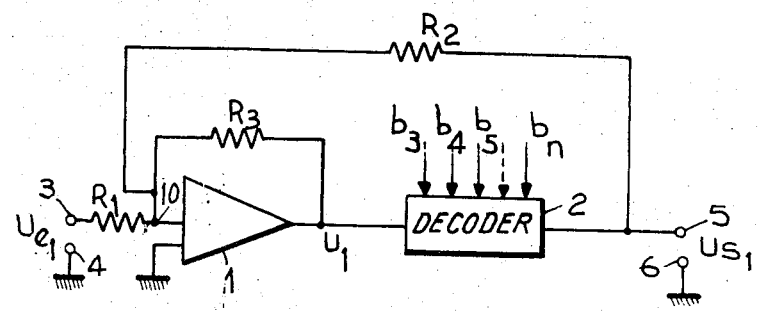

The circuit comprises to this end two operational amplifiers, respectively feeding two linear decoders, with two feedback loops between the outputs of the decoders and the inputs of the amplifiers.

---

The present invention relates to digital-to-analogue converter circuits of the type supplying, from two input voltages $Ue_1$ and $Ue_2$, and from an angle $\theta_1$, comprised between 0 and 90°, and given in digital form, two output voltages $Us_1$ and $Us_2$, such that $$\frac{Us_1}{Us_2} = \frac{Ue_1}{Ue_2} \frac{\theta_1}{\theta_2} \frac{1+\beta\theta_2}{1+\beta\theta_1}$$

where $\theta_2$ is the angle complementary to $\theta_1$, and $\beta$ a parameter.

It is known that if $\beta$ is suitably chosen (equal to $6.165/10^3$ if $\theta_1$ and $\theta_2$ are expressed in degrees), the ratio $$f(\theta_1) = \frac{\theta_1}{\theta_2} \frac{1+\beta\theta_2}{1+\beta\theta_1}$$

is equal to $$tg\ \theta_1 + \epsilon$$

where $\epsilon$ is a term which varies according to the value of $\theta_1$, but whose absolute value remains lower than 1.8 arc-min. The precision may be enhanced if $\beta$ is made to vary with $\theta_1$.

Disregarding this term $\epsilon$, $Us_1$ and $Us_2$, may be written as $$Us_1 = Ue_1 K(\theta_1) \sin \theta_1$$
$$Us_2 = Ue_2 K(\theta_1) \cos \theta_1$$

where $K(\theta_1)$ is a function of $\theta_1$.

It is also known that a converter circuit of the aforesaid type has numerous applications in synchro systems.

In such systems the variation of $K(\theta_1)$ ($\pm 6.5\%$) appears as a variation of the stiffness of the coupling, with no effect on precision.

A circuit of this type has been proposed, which uses two networks comprising weighted resistances connected in parallel by means of switches operated by the various digits which represent the digital value of angle $\theta_1$.

These two networks respectively fed by voltages $Ue_1$ and $Ue_2$, respectively deliver voltages $Us_1$ and $Us_2$, whose ratio is of the above indicated form.

But a converter of this kind possesses the defect that the switched terminals of the network resistances are either grounded or left free. When left free, they are in fact grounded through unavoidable stray capacities. This limits the network's maximum operating frequency, for a given degree of precision.

The purpose of the present invention is to overcome this serious drawback.

According to the present invention, there is provided a digital-to-analogue converter circuit of the type comprising a first and a second voltage input for respectively receiving two input voltages $Ue_1$ and $Ue_2$, means for applying to said circuit a digital input signal, which is a function of an angle $\theta_1$ comprised between 0 and 90°, and two voltage outputs for respectively supplying two output voltages $Us_1$ and $Us_2$ such that $$\frac{Us_1}{Us_2} = \frac{Ue_1}{Ue_2} \frac{\theta_1}{\theta_2} \frac{1+\beta\theta_2}{1+\beta\theta_1}$$

where $\theta_2$ is the angle complementary to angle $\theta_1$ and $\beta$ a parameter, said converter circuit comprising: a first and a second linear decoder having respective voltage inputs, respective voltage outputs respectively building up said converter circuit first and second outputs, and respective digital inputs for respectively imparting to said decoders gains $k\theta_1$ and $k\theta_2$ where $k$ is a constant; a first and a second operational amplifier having respective outputs respectively coupled to said voltage inputs of said first and second decoders, and respective inputs; the input of said first amplifier being coupled through respective resistors to said first input of said circuit, to said first amplifier output, and to the output of one of said decoders, and the input of said second amplifier being coupled through respective resistors to said second input of said circuit, to said second amplifier output, and to the output of the other one of said decoders.

Figure 2A:
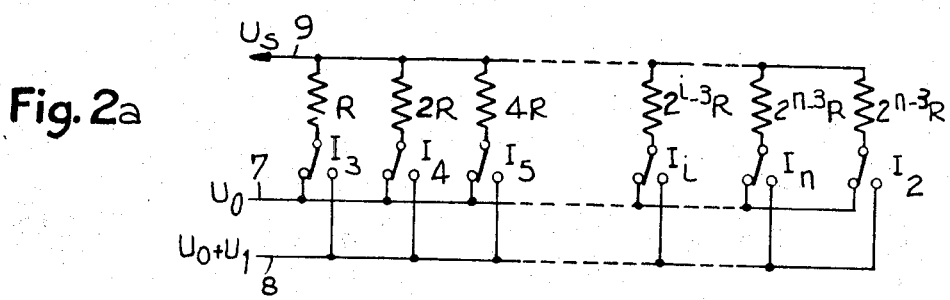
Figure 2B:
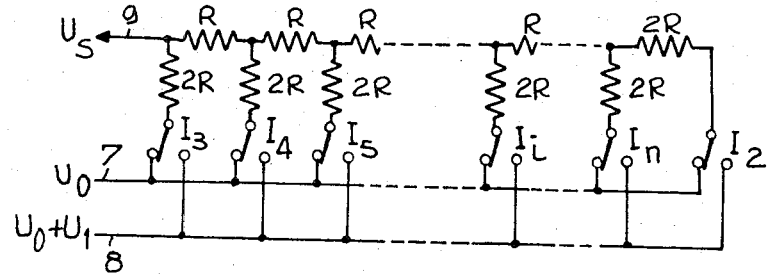
Figure 2C:
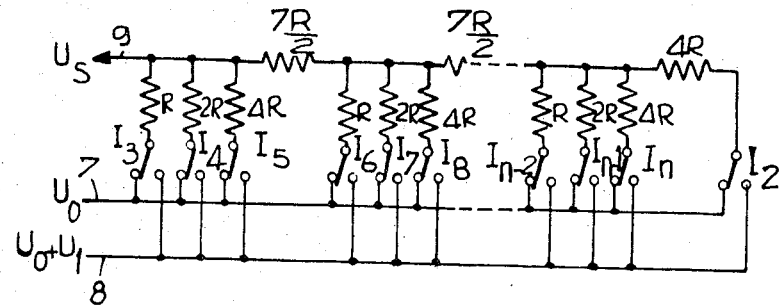

The invention will be best understood and other characteristics thereof will become apparent from the following description and the appended drawing, in which:

FIG. 1 is a diagram of part of a circuit according to the invention;

FIGS. 2a, 2b, and 2c show various embodiments of linear decoders which may be used in the circuit according to the invention;

FIG. 3 shows one embodiment of a synchro-transmitter including a circuit according to the invention; and FIG. 4 is the diagram of a digitally controlled system for controlling the position of a shaft, using a crossed-coupling modification of the converter circuit according to the invention.

In the more versatile embodiment of the circuit according to the invention, the outputs of the first and second linear decoders are respectively coupled to the inputs of the first and the second operational amplifiers.

In this case, the circuit according to the invention comprises two networks, respectively coupling the first input of the circuit to its first output, and its second input to its second output, those two networks being respectively referred to as the $\theta_1$-network and the $\theta_2$-network.

FIG. 1 illustrates the first of those two networks and shows the first input of the circuit, comprising terminals 3 and 4 and the first output, comprising terminals 5 and 6, terminals 4 and 6 being grounded.

An operational amplifier 1 has its input 10 connected to terminal 3 through a resistor $R_1$ and its output connected to the voltage input of a linear decoder 2, whose output is connected to terminal 5. The input 10 of amplifier 1 is connected to its output through a resistor $R_3$ and to the terminal 5 through a resistor $R_2$.

The linear decoder 2, having a constant output resistive impedance $Z_c$, comprises a digital input for receiving a coded signal $P_1$, comprising bits $b_3$ to $b_n$, representative either of an angle $\theta_1$ comprised between 0 and 90°, i.e.

$$\theta_1 = 360 \sum_{i=3}^{i=n} b_i 2^{-i}$$

or this same angle less $360°/2^n$. The structure of the linear decoder is adapted to each case, so that in both cases, the gain imparted to the decoder should be $k\theta_1$, where $k$ is a constant.

The operation is as follows:

An A-C input voltage $Ue_1$ is applied between terminals 3 and 4, giving rise to a voltage $U_1$ at the input of the decoder 2, which thus supplies an output voltage $$Us_1 = k \cdot \theta_1 \cdot Ue_1 \frac{R_2}{Z_c + R_2} \quad (1)$$

The amplifier 1 being an operational amplifier, its gain and the product thereof by its input impedance are very high, so that the voltage and current to ground at input 10 are substantially zero. From this results that:

$$\frac{U_{e1}}{R_1} + \frac{U_1}{R_3} + \frac{Us_1}{R_2} = 0 \quad (2)$$

and further, taking into account relation (1):

$$\frac{Us_1}{Ue_1} = -\frac{R_2}{R_1} \cdot \frac{\beta \theta_1}{1 + \beta \theta_1}$$

where $$\beta = k \frac{R_3}{Z_c + R_2}$$

The second network, designed to operate with an input voltage $Ue_2$ and a digital input signal $P_2$, comprising bits $d_3$ to $d_n$, and representative of either $\theta_2$ or $$\theta_2 - \frac{360}{2^n}$$

is identical to the first one, except that its linear decoder may slightly differ from that of the $\theta_1$—network, if $P_1$ is representative of $\theta_1$, and $P_2$ of $$\theta_2 - \frac{360}{2^n}$$

or vice versa, i.e. $P_1$ representative of $$\theta_1 - \frac{360}{2^n}$$

and $P_2$ of $\theta_2$, those two cases having a particular interest in that $d_3$ to $d_n$ are then identical to bits $\bar{b}_3$ to $\bar{b}_n$ complementary to bits $b_3$ to $b_n$.

This second network gives thus an output voltage $Us_2$ such that:

$$\frac{Us_2}{Ue_2} = -\frac{R_2}{R_1} \frac{\beta \theta_2}{1 + \beta \theta_2}$$

where has the same expression as before, and:

$$\frac{Us_1}{Us_2} = \frac{Ue_1}{Ue_2} \frac{\theta_1}{\theta_2} \frac{1 + \beta \theta_2}{1 + \beta \theta_1}$$

FIG. 2 shows three possible types of linear decoders having a constant output impedance $Z_c$ which may be used in each of the two networks of the above described circuit.

In FIG. 2a, switches $I_3$ to $I_n$ are respectively controlled bp the binary digits $b_3$ to $b_n$ or $d_3$ to $d_n$.

According to whether the controlling digit $b_i$ or $d_i$ has the value 0 or 1, switch $I_i$ ($i$ varying from 3 to $n$) connects the weighted resistance $2^{i-3} \times R$, either to input 7 held at a constant D-C potential $U_0$ and grounded for the operating frequency of the decoder, or to input 8 which receives the input voltage $U_1$, taken with respect to the potential $U_0$.

The other end of the resistance $2^{i-3} \times R$ is connected to output 9 which delivers the output voltage $U_s$.

Switch $I_2$ connects an additional resistance $2^{n-3} \times R$ either to input 7, or to input 8 according to whether the digital input is representative of angle $\theta_j$ ($j$=1 or 2) or of $\theta_j - 360/2^n$, for this additional resistance compensates for the missing part in the digital input. In FIG. 2, as well as in the following ones, mechanical switches are shown for the sake of clarity, but of course electro- mechanical or electronic switches are advantageously used.

FIG. 2b shows the so-called "ladder" decoder.

Switches $I_3$ to $I_n$, and $I_2$ are operated in the same way as before. However, all the resistors switched by means of switches $I_3$ to $I_n$ have a common value $2R$, and are interconnected by means of resistors having the value $R$. The additional resistor switched by means of switch $I_2$ has the value $2R$.

FIG. 2c shows a so-called "compound" decoder. In the example represented the switched resistances are grouped in groups of 3 binary digits. Calculation then shows that, in order that each group shall comprise the same resistances R, 2R and 4R, the coupling resistances between groups must have the value $7R/2$. The additional resistance switched by switch $I_2$ has the value $4R$.

The decoder of FIG. 2a is the simplest but possesses the drawback of needing high value resistances $2^{n-3} \times R$ which are difficult to obtain.

So preference will be given to the decoders of FIGS. 2b and 2c, the "compound" decoder, in particular, giving a compromise between the number of resistances required and the maximum ohmic value to be allocated.

Of course, if $P_1$, for example, is always representative of $\theta_1$, switch $I_2$ and the additional element switched thereby may be eliminated, while if $P_1$ should always be equal to $\theta_1 - 360/2^n$, the additional element, while being retained, need not be associated with a switch.

FIG. 3 shows the circuit diagram of a first example of application of the converter circuit according to the invention for the construction of an entirely static synchro-transmitter.

In general a synchro-transmitter has to deliver, on a 2-wire connection, voltages proportional to $\sin \theta$ and $\cos \theta$, where $\theta$ is the angle to be transmitted and varies between 0 and 360°.

Such an angle, given in digital form, is expressed by:

$$\theta = 360 \sum_{i=1}^{i=n} a_i \cdot 2^{-i} = \theta_o + \theta_3$$

where $\theta_3$ is an angle less than 90° and is given by the binary digits $a_3$ to $a_n$, and $a_1$ and $a_2$ are the binary digits which characterize the quadrant in which the angle $\theta$ is contained.

The table below shows how the values of $\sin \theta$ and $\cos \theta$ are derived from the values of $\sin \theta_3$ and $\cos \theta_3$ and the values of the binary digits $a_1$ and $a_2$.

| $a_1$ | $a_2$ | $\theta$ | $\sin \theta$ | $\cos \theta$ |
|---|---|---|---|---|
| 0 | 0 | $\theta_3$ | $\sin \theta_3$ | $\cos \theta_3$ |
| 0 | 1 | $90 + \theta_3$ | $\cos \theta_3$ | $-\sin \theta_3$ |
| 1 | 0 | $180 + \theta_3$ | $-\sin \theta_3$ | $-\cos \theta_3$ |
| 1 | 1 | $270 + \theta_3$ | $-\cos \theta_3$ | $\sin \theta_3$ |

The synchro-transmitter of FIG. 3 comprises two networks 24 and 25 similar to that described in FIG. 1, each one of the decoders comprising an additional resistor switched by a switch $I_2$, as shown in the description of FIG. 2.

The reference voltage $U_R$ is applied between terminals 210 and 211 of the primary of a transformer 21. The secondary of transformer 21 has a midde-point connected to ground and the voltages collected between respectively terminals 212 and 213, and ground, are respectively in phase and in phase opposition with voltage $U_R$.

The input of network 24 is connected either to terminal 212 or to terminal 213 by the moving contact 220 of a switch 22 provided with a control input 221. Network 24 is provided with digital control inputs 240 and 241 for controlling the linear decoder of network 24.

The input of network 25 is connected either to terminal 213 or to terminal 212 by the moving contact 230 of a switch 23 provided with a control input 231. Network 25 is provided with digital control inputs 250 and 251 for controlling the network linear decoder.

It is desired to collect a sin $\theta$ voltage and a cos $\theta$ voltage respectively on the outputs 242 and 252.

The various binary control digits are derived by means of a logic circuit, 26, from the binary digits $a_1$ to $a_n$ applied to inputs 260 and which represent the angle $\theta$ to be transmitted. The connections between the outputs 261, 262, 263, 264, 265 and 266 of the circuit 26 with respectively the inputs 221, 231, 240, 250, 241, and 251 have not been shown.

The action is as follows, referring to the table given above:

Each of the networks 24 and 25 has to supply voltages whose amplitudes are proportional to sin $\theta_3$ or cos $\theta_3$ according to the value of the binary digit $a_2$, i.e. the angle $\theta_1$ controlling the gain of the decoder of network 24 must be equal to $\theta_3$ or to 90—$\theta_3$ according to whether $a_2$ is 0 or 1. To this end switches $I_3$ to $I_n$ of the decoder of network 24 are respectively controlled by the binary digits $$b_1 = a_1.\overline{a_2} + \overline{a_1}.a_2$$

and the switch $I_2$ of this decoder by the binary digit $a_2$.

In the same way, the decoder of network 25 and its switch $I_2$ are respectively controlled by the binary digits $\overline{b_1}$ and $\overline{a_2}$.

The appropriate sign + or — for the voltages at outputs 242 and 253 given in the above table is obtained by applying at the inputs of networks 24 and 25 voltages in phase or in phase opposition with $U_R$. To this end switch 22 is controlled by the binary digit $a_1$ and switch 23 by the binary digit $\overline{c}$, c being equal to $\overline{a_1}.\overline{a_2} + a_1.a_2$.

The two switches 22 and 23 are shown in FIG. 3 in the "positive sign" position, i.e. assuming the angle $\theta$ is contained in the first quadrant ($a_1=0$, $a_2=0$). The values of the voltages collected at outputs 242 and 252 are respectively $K(\theta_1) \cdot U_R \sin \theta$ and $K(\theta_1) \cdot U_R \cos \theta$, where $K(\theta_1)$ is a function of $\theta_1$.

If a three-wire synchro-detection coupling is required, all that is required is to connect outputs 242 and 252 to a SCOTT transformer.

FIG. 4 shows an embodiment of a shaft-positioning system with digital control, using a modification of the digital-to-analogue converter circuit according to the invention, wherein the outputs of the first and second linear decoders are respectively coupled to the inputs of the second first operational amplifiers.

Two voltages of equal amplitude and in phase opposition are collected at the terminals of the secondary, whose midde-point is grounded, of a transformer 40. These terminals are connected to a selector 41 controlled by the binary digits $a_1$ and $a_2$ applied at its control input 410. Those binary digits $a_1$ and $a_2$ are the digits of greatest weight of a series of digits $a_1$ to $a_n$ representing an angle $\theta$ supplied, for example, by a store register. Again $\theta = \theta_0 + \theta_3$, where $\theta_3$ is represented by the digits $a_3$ to $a_n$. The outputs of selector 41 are connected to windings 420 and 421 of the stator of a resolver 42. Windings 422 and 423 of the rotor of resolver 42 are respectively connected to input resistances 43 and 44 of the converter circuit according to the invention.

Resistance 43 is connected to operational amplifier 45 shown with its negative feed-back resistance 47.

The output of amplifier 45 is connected to a linear decoder 51 controlled by the binary digits $a_3$ to $a_n$ received at its input 510, so as to show a gain $k\theta_3$, this decoder not needing an additional element switched by switch $I_2$ (FIG. 2), since it is always controlled by a digital input signal $P_1$ representative of $\theta_3$.

Similarly, resistance 44 is connected to an operational amplifier 46 provided with a negative feed-back resistance 48. The output of amplifier 46 is connected to a linear decoder 52 controlled by the binary digits $\overline{a_3}$ to $\overline{a_n}$ and with a gain $k(90-\theta_3)$. This digital input signal $P_2$ being always representative of $$90 - \theta_3 - \frac{360}{2^n}$$

the decoder 52 includes the additional element compensating for the missing term $360/2^n$, but of course no switch $I_2$ is required (FIG. 2).

The negative feedback circuits between the outputs 51 and 52 of the converter circuit according to the invention, which is used in the system of FIG. 4, and the inputs of this circuit, are crossed, resistance 49 being connected between the output of decoder 52 and the input of amplifier 45, and resistance 50 being connected between the output of decoder 51 and the input of amplifier 46.

The outputs of decoders 51 and 52 are connected to the terminals of the primary of a transformer 53 whose secondary delivers to an amplifier 54 a voltage proportional to the difference of the voltages $Us_1$ and $Us_2$ applied to the primary.

The output voltage of amplifier 54 controls a motor 55 which sets shaft 424 of resolver 42 in an angular position $\theta_e$ with respect to a fixed axis of reference. A generator 56 whose shaft is fixed to that of motor 55 provides continuous damping on the servo-loop produced.

The action is a follows:

The binary digits $a_1$ and $a_2$ control the quadrant in which the resolver is to be angularly positioned, modifying by a multiple of 90° the position of the reference axis provided by the stator. And so, windings 422 and 423 supply respectively the voltages $Ue_1 = V \cos \theta e_3$ and $Ue_2 = V \sin \theta e_3$ the relation of $\theta e_3$ less than 90° with respect to $\theta e$ being the same as that of $\theta_3$ with respect to $\theta$.

When the servo-loop has operated, i.e. the error term $\epsilon$ between the output voltages $Us_1$ and $Us_2$ of the decoders 51 and 52 is negligible, there is obtained $Us_1 = Us_2$.

From this results that if the value of the coupling resistors are suitably chosen, the same relations between $Us_1$ and $Ue_1$ on the one hand, and $Us_2$ and $Ue_2$ on the other hand, may be obtained as with the first embodiment of the converter circuit according to the invention, i.e. disregarding the error term $\epsilon$ in the approximation $$\frac{\theta_1}{\theta_2} \frac{1+\beta\theta_2}{1+\beta\theta_1} = \tan \theta_1^2 +$$

there is obtained:

$$\frac{Us_1}{Us_2} = \frac{Ue_1}{Ue_2} \tan \theta_1 = \frac{\cos \theta e_1}{\sin \theta e_1} \frac{\sin \theta_1}{\cos \theta_1}$$

And, again since $Us_1 = Us_2$:

$$\sin \theta_1 \cos \theta e_1 = \sin \theta e_1 \cos \theta_1$$

i.e $$\sin (\theta_1 = \theta e_1) = 0$$
$$\theta_1 = \theta e_1$$

and the angular position $\theta e$ of shaft 424 reproduces the angle $\theta$ with a high degree of precision.

The cross coupled embodiment of the circuit, however, does not apply in every case.

Calculation shows that, beside the case where the circuit is part of a servo-system where the error term is $Us_1 - Us_2$, it also applies, for example, where $Ue_1$ is identical to $Ue_2$, and phase inverters are inserted in series with the two resistors of the two cross-couplings.

It is to be understood that the examples described are not restrictive of the invention.

What is claimed, is:

1. A digital-to-analogue converter circuit of the type comprising a first and a second voltage input for respectively receiving two input voltages $Ue_1$ and $Ue_2$, and two voltage outputs for respectively supplying two output voltages $Us_1$ and $Us_2$ such that $$\frac{Us_1}{Us_2} = \frac{Ue_1}{Ue_2} \frac{\theta_1}{\theta_2} \frac{(1+\beta\theta_2)}{(1+\beta\theta_1)}$$

where $\theta_1$ is an angle comprised between 0 and 90°, $\theta_2$ is the angle complementary to angle $\theta_1$ and $\beta$ a parameter, said converter circuit comprising: a first and a second linear decoder having respective voltage inputs, respective voltage outputs which respectively are said converter circuit first and second outputs, and respective sets of digital inputs; a logic circuit, having inputs for receiving digital signals representative of said angle $\theta_1$, and a first and a second set of outputs respectively coupled to said sets of digital inputs of said first and second linear decoder for respectively applying to said first and second linear decoder digital signals causing them to impart gains respectively equal to $k\theta_1$ and $k\theta_2$, where $k$ is a constant, to the input voltages respectively applied to their voltage inputs; a first and a second operational amplifier having respective outputs respectively coupled to said voltage inputs of said first and second decoders for supplying their respective output voltages to said voltage inputs of said first and second linear decoders respectively, and respective inputs; the input of said first amplifier being coupled through respective resistors to said first input of said circuit, to said first amplifier output, and to the output of one of said decoders, and the input of said second amplifier being coupled through respective resistors to said second input of said circuit, to said second amplifier output, and to the output of the other one of said decoders.

2. A converter circuit as claimed in claim 1, wherein the inputs of said first and second operational amplifiers are respectively coupled to the first and second outputs of said converter circuit.

3. A converter circuit as claimed in claim 1, wherein the outputs of said first and second operational amplifiers are respectively coupled to the second and first outputs of said converter circuit.

4. A converter circuit as claimed in claim 1, wherein said digital input of at least one of said decoders comprises $(n-2)$ terminals, where $n$ is an integer greater than 2, for applying thereto the $(n-2)$ bits of the coded signal representative of an angle $\alpha$, and an additional input for receiving an additional bit, so that for one value of said additional bit, said decoder is imparted a gain equal to $k\alpha$, and that for the other value of said additional bit, said decoder is imparted a gain $$k\left(\alpha+\frac{\alpha_0}{2^n}\right)$$

where $\alpha$ and $\alpha_0$ are expressed in the same units in which $\alpha_0$ is equivalent to four right angles.

References Cited

UNITED STATES PATENTS

| | | | |
|---|---|---|---|
| 2,853,699 | 9/1958 | O'Neil | 340—347 |
| 3,277,464 | 10/1966 | Naydan et al. | 340—347 |
| 3,345,505 | 10/1967 | Schmid | 235—197 |

THOMAS A. ROBINSON, Primary Examiner

M. K. WOLENSKY, Assistant Examiner